United States Patent
Heath, Jr. et al.

(10) Patent No.: US 6,937,592 B1
(45) Date of Patent: Aug. 30, 2005

(54) WIRELESS COMMUNICATIONS SYSTEM THAT SUPPORTS MULTIPLE MODES OF OPERATION

(75) Inventors: Robert W. Heath, Jr., Los Altos, CA (US); Rajeev Krishnamoorthy, Sunnyvale, CA (US); Peroor K. Sebastian, Mountain View, CA (US); Arogyaswami J. Paulraj, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 09/653,060

(22) Filed: Sep. 1, 2000

(51) Int. Cl.$^7$ .......................... H04B 7/216; H04B 7/212
(52) U.S. Cl. ...................... 370/342; 370/337
(58) Field of Search ............... 370/310, 328, 370/329, 335, 336, 337, 339, 340, 342

(56) References Cited

U.S. PATENT DOCUMENTS

| | | | |
|---|---|---|---|
| 5,345,599 A | 9/1994 | Paulraj et al. | 455/49.1 |
| 5,515,378 A * | 5/1996 | Roy et al. | 370/334 |
| 5,642,353 A * | 6/1997 | Roy et al. | 370/329 |
| 6,058,105 A | 5/2000 | Hochwald et al. | 370/310 |
| 6,067,290 A * | 5/2000 | Paulraj et al. | 370/329 |
| 6,097,771 A | 8/2000 | Foschini | 375/346 |
| 6,144,711 A | 11/2000 | Raleigh et al. | 375/347 |
| 6,317,420 B1 * | 11/2001 | Schiff | 370/325 |
| 6,351,499 B1 * | 2/2002 | Paulraj et al. | 375/267 |
| 6,400,699 B1 * | 6/2002 | Airy et al. | 370/329 |

\* cited by examiner

Primary Examiner—Phirin Sam
Assistant Examiner—Andrew Wahba
(74) Attorney, Agent, or Firm—Michael A. Proksch

(57) ABSTRACT

A wireless communications adapts its mode of operation between spatial multiplexing and non-spatial multiplexing in response to transmission-specific variables. An embodiment of a wireless communications system for transmitting information between a base transceiver station and a subscriber unit includes mode determination logic. The mode determination logic is in communication with the base transceiver station and the subscriber unit. The mode determination logic determines, in response to a received signal, if a subscriber datastream should be transmitted between the base transceiver station and the subscriber unit utilizing spatial multiplexing or non-spatial multiplexing. In an embodiment, the mode determination logic has an input for receiving a measure of a transmission characteristic related to the received signal. In an embodiment, the mode determination logic includes logic for comparing the measured transmission characteristic to a transmission characteristic threshold and for selecting one of spatial multiplexing and non-spatial multiplexing in response to the comparison of the measured transmission characteristic to the transmission characteristic threshold. In an embodiment, the transmission characteristic includes at least one of delay spread, post-processing signal-to-noise ratio, cyclical redundancy check (CRC) failure, residual inter-symbol interference, mean square error, coherence time, and path loss. By adapting the mode of operation in response to transmission-specific variables, the use of spatial multiplexing can be discontinued in unfavorable conditions. Additionally, because the wireless communications system can adapt its mode of operation between spatial multiplexing and non-spatial multiplexing, the communications system is compatible with both subscriber units that support spatial multiplexing and subscriber units that do not support spatial multiplexing.

47 Claims, 8 Drawing Sheets

WIRELESS COMMUNICATIONS SYSTEM THAT SUPPORTS MULTIPLE MODES OF OPERATION

FIELD OF THE INVENTION

The invention relates generally to wireless communications systems that use multiple access protocols. More particularly, the invention relates to a wireless communications system that supports wireless transmissions with spatial multiplexing and without spatial multiplexing.

BACKGROUND OF THE INVENTION

Wireless communications systems use multiple access protocols, such as time-division multiple access (TDMA), frequency-division multiple access (FDMA), code-division multiple access (CDMA), and space-division multiple access (SDMA) protocols, to enable wireless communications between base transceiver stations and multiple subscriber units. Typically, a wireless communications system includes multiple base transceiver stations that are spaced to create subscriber cells. Subscriber units, which may include mobile or fixed units, exchange information between a nearby base transceiver station over a dedicated radio frequency.

First generation wireless communications systems utilize single antenna transceivers to exchange information between a base transceiver station and a subscriber unit. While wireless communications systems with single-antenna transceivers work well, they are subject to channel degradation from, for example, multipath fading and/or signal interference. Next generation wireless communications system have been developed which utilize multiple spatially separated antennas at the base transceiver station and/or the subscriber unit to transmit a subscriber datastream over multiple paths. Transmitting a subscriber datastream between a base transceiver station and a subscriber unit over multiple paths is referred to as transmission diversity. Because the transmission antennas are spatially separated, the receiving device receives diverse signals that can be processed to reduce multipath fading and to suppress interfering signals.

While transmission diversity involves transmitting a subscriber datastream over multiple paths, each of the transmitted datastreams carries the same information. New wireless communications systems have been developed that utilize multiple spatially separated antennas at the base transceiver stations and the subscriber units to multiplex transmissions in order to increase the bit rates between the base transceiver stations and the subscriber units. The technique, known as spatial multiplexing, is described in U.S. Pat. No. 6,067,290, which is assigned to the assignee of the present invention.

Although spatial multiplexing works well to increase the bit rate between base transceiver stations and subscriber units that support spatial multiplexing, not all base transceiver stations and subscriber units support spatial multiplexing. In addition, even when a base transceiver station and a subscriber unit both support spatial multiplexing, it may not be appropriate to utilize spatial multiplexing for every transmission. For example, transmission conditions may be such that spatial multiplexing provides poor results, thereby eliminating the possibility of an increased bit rate that is provided by spatial multiplexing.

In view of the fact that not all base transceiver stations and subscriber units in wireless communications systems support spatial multiplexing and in view of the fact that spatial multiplexing may not always be the most effective transmission technique between base transceiver stations and subscriber units even when both devices support spatial multiplexing, what is needed is a wireless communications system and method that adapts its mode of operation between spatial multiplexing and non-spatial multiplexing in response to various transmission-specific variables.

SUMMARY OF THE INVENTION

A system and method for wireless communications adapts its mode of operation between spatial multiplexing and non-spatial multiplexing in response to transmission-specific variables. By adapting the mode of operation in response to transmission-specific variables, the use of spatial multiplexing can be discontinued in unfavorable conditions. Additionally, because the wireless communications system can adapt its mode of operation between spatial multiplexing and non-spatial multiplexing, the communications system is compatible with both subscriber units that support spatial multiplexing and subscriber units that do not support spatial multiplexing.

An embodiment of a wireless communications system for transmitting information between a base transceiver station and a subscriber unit includes mode determination logic. The mode determination logic is in communication with the base transceiver station and the subscriber unit. The mode determination logic determines, in response to a received signal, if a subscriber datastream should be transmitted between the base transceiver station and the subscriber unit utilizing spatial multiplexing or non-spatial multiplexing.

In an embodiment, the mode determination logic has an input for receiving a measure of a transmission characteristic related to the received signal. In an embodiment, the mode determination logic includes logic for comparing the measured transmission characteristic to a transmission characteristic threshold and for selecting one of spatial multiplexing and non-spatial multiplexing in response to the comparison of the measured transmission characteristic to the transmission characteristic threshold. In an embodiment, the transmission characteristic includes at least one of delay spread, post-processing signal-to-noise ratio, cyclical redundancy check (CRC) failure, residual inter-symbol interference, mean square error, coherence time, and path loss.

In an embodiment, the base transceiver station and the subscriber unit utilize a multiple access protocol to transmit the subscriber datastream, wherein the multiple access protocol is selected from at least one of a group of multiple access protocols consisting of: code-division multiple access, frequency-division multiple access, time-division multiple access, space-division multiple access, orthogonal frequency division multiple access, wavelength division multiple access, wavelet division multiple access, orthogonal division multiple access, and quasi-orthogonal division multiple access.

In an embodiment, mode determination information is communicated between the base transceiver station and the subscriber unit over a control channel that includes a dedicated mode identification field.

In an embodiment, the mode determination logic has an input for receiving system specifications related to the signal receive capability of at least one of the base transceiver station and the subscriber unit.

In an embodiment, the mode determination logic has an input for receiving system specifications related to the signal transmit capability of at least one of the base transceiver station and the subscriber unit.

In an embodiment, the mode determination logic includes logic for determining if both the base transceiver station and the subscriber unit support spatial multiplexing, and for selecting non-spatial multiplexing for transmission of the subscriber datastream if one of the base transceiver station and the subscriber unit does not support spatial multiplexing.

In an embodiment, non-spatial multiplexing transmission modes include single-carrier transmissions, multi-carrier transmissions, multi-code transmissions, transmit diversity, and beamforming. In an embodiment, transmit diversity includes selection diversity, space-time coding, and maximum ratio combining. In an embodiment, the base transceiver station and the subscriber unit are capable of transmitting the subscriber datastream in more than one of said non-spatial multiplexing transmission modes.

In an embodiment, the mode determination logic resides within the subscriber unit and in another embodiment, the mode determination logic resides within the base transceiver station.

A method for operating a wireless communications system involves receiving a signal transmission at one of a base transceiver station and a subscriber unit via the wireless communications system, and determining, in response to the received signal transmission, whether a subscriber datastream should be transmitted between the base transceiver station and the subscriber unit utilizing spatial multiplexing or non-spatial multiplexing.

In an embodiment, the method includes additional steps of measuring a transmission characteristic of the received signal transmission, comparing the measured transmission characteristic to a transmission characteristic threshold, and selecting one of spatial multiplexing and non-spatial multiplexing in response to the comparison of the measured transmission characteristic to the transmission characteristic threshold.

In an embodiment, the transmission characteristic includes at least one of delay spread for the received signal transmission, post-processing signal-to-noise ratio for the received signal transmission, CRC failure for the received signal transmission, residual inter-symbol interference for the received signal transmission, mean square error for the received signal transmission, coherence time of the channel, and path loss.

Another embodiment of a wireless communications system for transmitting information between a base transceiver station and a subscriber unit includes a control channel for communicating if a subscriber datastream should be transmitted between the base transceiver station and the subscriber unit utilizing spatial multiplexing or non-spatial multiplexing.

In an embodiment, the control channel is used to indicate the spatial multiplexing or non-spatial multiplexing capability of one of the base transceiver station and the subscriber unit.

In an embodiment, the control channel is used to indicate a change in the mode of operation between spatial multiplexing and non-spatial multiplexing.

In an embodiment, the control channel includes a dedicated field in a frame that is part of the subscriber datastream.

In an embodiment, the wireless communications system further includes mode determination logic, in communication with the base transceiver station and the subscriber unit, for determining, in response to a received signal, if a subscriber datastream should be transmitted between the base transceiver station and the subscriber unit utilizing spatial multiplexing or non-spatial multiplexing.

Other aspects and advantages of the present invention will become apparent from the following detailed description, taken in conjunction with the accompanying drawings, illustrating by way of example the principles of the invention.

DETAILED DESCRIPTION OF THE INVENTION

As shown in the figures for purposes of illustration, the invention is embodied in a system and method for wireless communications that adapts its mode of operation between spatial multiplexing and non-spatial multiplexing in response to transmission-specific variables. By adapting the mode of operation in response to transmission-specific variables, the use of spatial multiplexing can be discontinued in unfavorable conditions. Additionally, because the wireless communications system can adapt its mode of operation between spatial multiplexing and non-spatial multiplexing, the communications system is compatible with both subscriber units that support spatial multiplexing and subscriber units that do not support spatial multiplexing.

Figure 1:
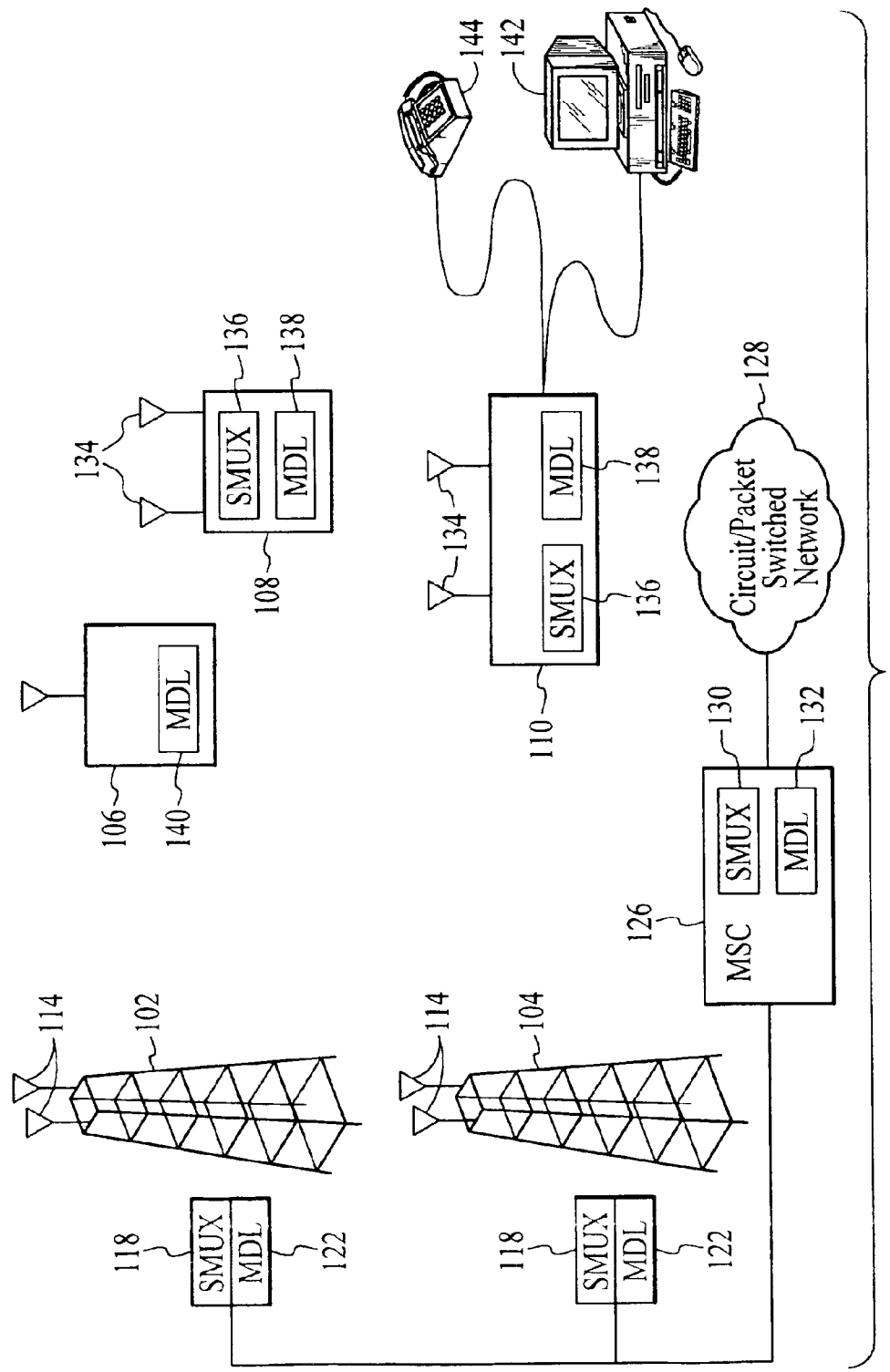
FIG. 1 depicts a wireless communications system that includes two base transceiver stations and two subscriber units that support spatial multiplexing, and a subscriber unit that does not support spatial multiplexing.

FIG. 1 depicts a multiple access wireless communications system that includes base transceiver stations (BTSs) 102 and 104 and subscriber units (SUs) 106, 108, and 110. The base transceiver stations include spatially separated antennas 114 and spatial multiplexing logic 118. The base transceiver stations also include mode determination logic 122 that enables the system to adapt its mode of operation between spatial multiplexing and non-spatial multiplexing in response to transmission-specific variables. The mode determination logic is the focus of the invention and is described in detail below. Multiple access protocols that may be utilized by the wireless communications system include TDMA, FDMA, CDMA, SDMA, orthogonal frequency division multiple access (OFDMA), wavelength division multiple access (WDMA), wavelet division multiple access, orthogonal division multiple access (ODMA), and quasi-ODMA protocols.

The antennas 114 of the base transceiver stations 102 and 104 are defined to be spatially separate if they are capable of transmitting/receiving spatially separated signals. A single antenna may be used to transmit/receive spatially separate signals provided it includes the ability to transmit/receive orthogonal radiation patterns. Hereinafter, the phrase "spatially separate" shall be understood to include any antenna, transmitter, or receiver capable of communicating spatially separate signals. The spatial multiplexing logic 118 at the base transceiver stations may work in conjunction with a master switch center (MSC) 126 to accomplish spatial multiplexing. Spatial multiplexing is described in more detail below. The base transceiver stations are configured to communicate with subscriber units of a traditional type, i.e. those that do not support spatial multiplexing as well as spatially enabled subscriber units, i.e. those that support either or both spatial multiplexing and non-spatial multiplexing.

Although the base transceiver stations 102 and 104 are shown as towers, the base transceiver stations may include satellites, balloons, planes etc. Additionally, the base transceiver stations may be located indoors or outdoors. As is known in the field of wireless communications, base transceiver stations are located to create coverage cells. Subscriber units within a coverage cell exchange radio frequency (RF) signals with one or more base transceiver stations that make up the cell. Multiple coverage cells combine to create a subscriber area.

The base transceiver stations 102 and 104 are connected to the master switch center 126 and the master switch center is connected to a network 128 such as a circuit switched network or a packet switched network. The master switch center is the interface between the circuit/packet switched network and the wireless communications system. The master switch center may include spatial multiplexing logic 130 that implements a portion of the spatial multiplexing process and mode determination logic 132 that implements a portion of the mode adaptation process. The master switch center controls the switching between the circuit/packet switched network and the base transceiver stations for all wireline-to-subscriber, subscriber-to-wireline, and subscriber-to-subscriber communications. The master switch center processes data received from the base transceiver stations that may include, for example, subscriber unit status, diagnostic data, and bill compiling information. In an embodiment, the master switch center communicates with the base transceiver stations using the X.25 protocol or IP protocol although other protocols are possible. The circuit/packet switched network may include a public switched telephone network (PSTN) or other carrier network.

The subscriber units 106, 108, and 110 shown in FIG. 1 include devices that support spatial multiplexing and devices that do not support spatial multiplexing. Subscriber units 108 and 110 support spatial multiplexing and include two or more spatially separate antennas 134 and spatial multiplexing logic 136. Because the subscriber units support spatial multiplexing, they also include mode determination logic 138, which may be used to determine the desired mode of operation for the subscriber units in response to transmission-specific variables. The mode determination logic is the focus of the invention and is described in more detail below. Subscriber unit 106 does not support spatial multiplexing, does not include spatial multiplexing logic, and includes one or more antennas. Subscriber units that do not support spatial multiplexing may or may not include mode determination logic. In the embodiment of FIG. 1, the subscriber unit 106 includes mode determination logic 140 that notifies the base transceiver stations 102 and 104 that the subscriber unit does not support spatial multiplexing.

The subscriber units 106, 108, and 110 may be mobile, portable, or fixed. Mobile subscriber units such as 106 and 108 may include mobile telephones, personal digital assistants (PDAs), and automobile based digital assistants. Portable subscriber units may include, for example, laptop computers. Fixed subscriber units such as subscriber unit 110 include customer premise equipment (CPE) that is coupled to a digital device, or devices, such as a computer 142, a telephone 144, a computer network, and a television.

Figure 2:
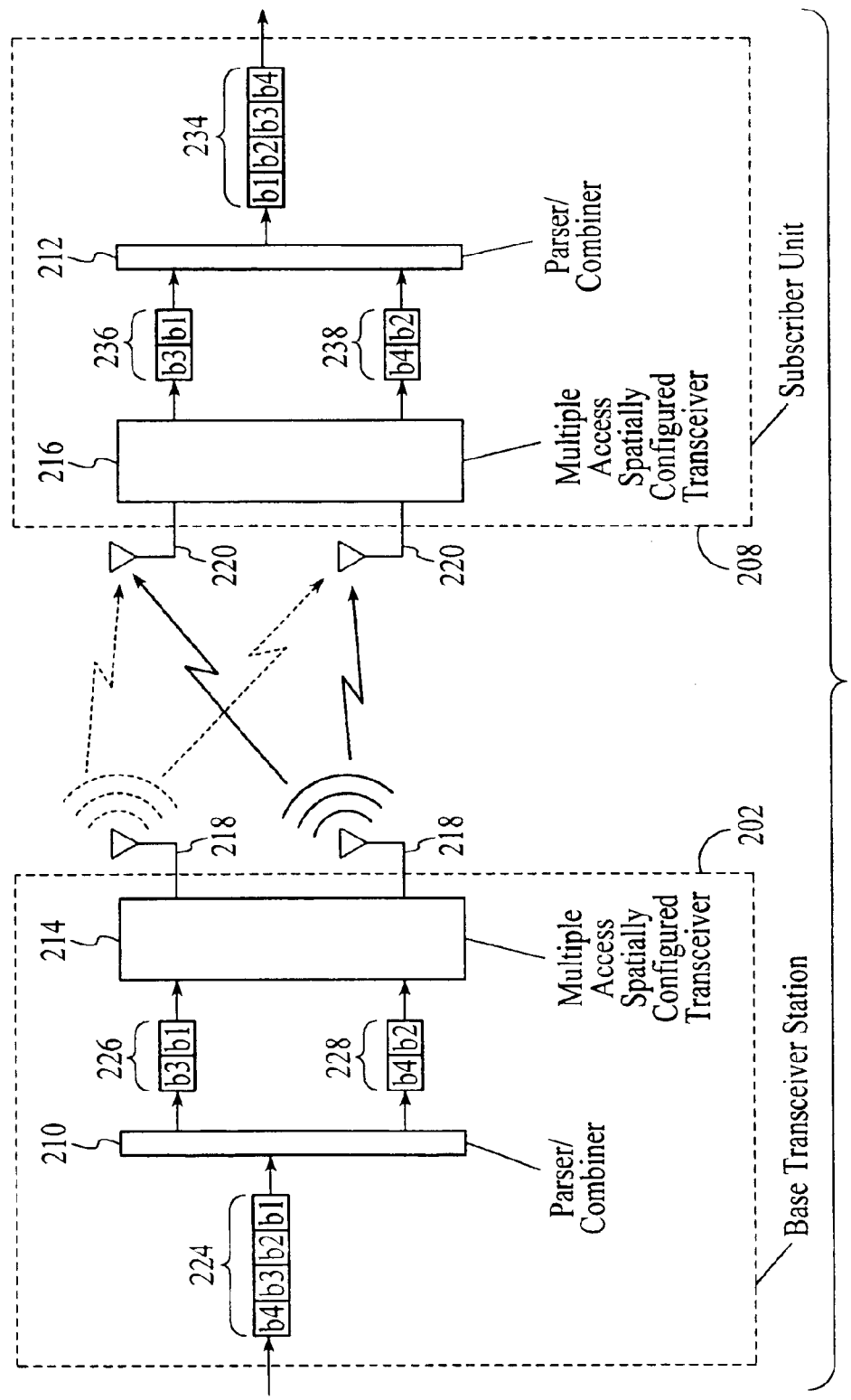
FIG. 2 depicts a spatially multiplexed transmission between a base transceiver station and subscriber unit.

FIG. 2 is a graphical depiction of a base transceiver station 202 and a subscriber unit 208 that support spatial multiplexing. As shown in FIG. 2, both the base transceiver station and the subscriber unit include a parser/combiner 210 and 212, a multiple access spatially configured transceiver 214 and 216, and at least two antennas 218 and 220. The parser/combiner breaks a subscriber datastream into substreams and re-assembles substreams into the original subscriber datastream. Referring to FIG. 2, a subscriber datastream 224 enters the base transceiver station 202 as a stream of sequential packets (or frames) b1, b2, b3, and b4 and is transmitted from the base transceiver station to the subscriber unit 208. The parser 210 at the base transceiver station divides the subscriber datastream into two substreams containing different packets from the sequence of packets. For example, the parser divides the subscriber datastream into one substream that includes packets b1 and b3 and into another substream that includes packets b2 and b4.

The multiple access spatially configured transceivers 214 and 216 perform various functions required for spatial multiplexing such as RF upconversion, RF downconversion, modulation, coding, decoding, and spatial processing. The spatially separate antennas 218 and 220 transmit and receive the spatially multiplexed signals. Referring to FIG. 2, the two substreams 226 and 228 at the base transceiver station 202 are processed by the multiple access spatially configured transceiver 214 of the base transceiver station and transmitted by the two spatially separate antennas 218 to the subscriber unit 208. The signals transmitted from the two base transceiver station antennas 218 are transmitted over the same frequency and are received by the two subscriber unit antennas 220. The multiple access spatially configured transceiver 216 at the subscriber unit 208 receives the two signals and utilizes spatial processing techniques to recover the two substreams 236 and 238. The two recovered substreams are then re-assembled by the combiner into the original subscriber datastream 234. The process is reversed when a subscriber datastream is transmitted from the subscriber unit to the base transceiver station.

It should be understood that FIGS. 1 and 2 are general depictions of base transceiver stations and subscribers units that support spatial multiplexing and that spatial multiplexing can be accomplished using more than two antennas at the base transceiver station and/or the subscriber unit. More detailed descriptions of spatial multiplexing are found in U.S. Pat. Nos. 5,345,599 and 6,067,290, both of which are incorporated by reference herein.

Although spatial multiplexing from a single base transceiver station is described with reference to FIG. 2, spatial multiplexing can also be accomplished by transmitting a spatially multiplexed signal from separate base transceiver stations. That is, one substream, for example the b1/b3 substream 226, can be transmitted to the subscriber unit from one base transceiver station while another substream, for example the b2/b4 substream 228, is transmitted to the same subscriber unit from a physically separate base transceiver station. Referring back to FIG. 1, one substream can be transmitted from base transceiver station 102 while the other substream is transmitted from base transceiver station 104. The multiple base transceiver station implementation as opposed to the single base transceiver station implementation can provide information signals that are easier to separate. Separation is easier because the multiple base transceiver station antennas transmit information signals which are received at angles of arrival that are typically greater than the angles of arrival of signals transmitted by a single base transceiver station with multiple antennas.

As described above, spatial multiplexing may not be supported by all base transceiver stations and subscriber units Subscriber datastreams that are not transmitted using spatial multiplexing are referred to as non-spatial multiplexed communications. Non-spatial multiplexed communications include any wireless communications techniques that do not utilize spatial multiplexing, such as single input single output communications and diversity communications. Single input single output communications involve transmission of a subscriber datastream from a single antenna transmitter to a single antenna receiver and are commonly subject to multipath fading. Diversity communication is a technique used in multiple antenna communications systems that reduces the effects of multipath fading. It may be applied to systems with multiple antennas at the transmitter and/or receiver. Non-spatial multiplexed communications may involve single-carrier transmissions, multi-carrier transmissions, multi-code transmissions, and beamforming.

Transmitter diversity can be obtained by providing a transmitter with two or more (N) antennas. The N antennas imply N channels that suffer from fading in a statistically independent manner. Therefore, when one channel is fading due to the destructive effects of multipath interference, another of the channels is unlikely to be simultaneously suffering from fading. By virtue of the redundancy provided by the N independent channels, a diversity receiver can often reduce the detrimental effects of fading. As is known in the field of wireless communications, transmitter diversity communications may include selection diversity, space-time coding, equal gain combining, and maximum ratio combining.

Two types of diversity communication implementations are possible. The first includes a single base transceiver station and the second includes multiple base transceiver stations. In the single base transceiver station implementation, the transmitter antennas that are used for transmitting information signals are elements of an antenna array at a single base transceiver station. In the multiple base transceiver stations implementation, transmitter antenna elements or antenna arrays are located at two or more base transceiver stations. The multiple base transceiver stations implementation as opposed to the single base transceiver station implementation can provide improved diversity gain. Diversity gain is improved because the multiple base transceiver station antennas transmit information signals which are received at angles of arrival that are typically greater than the angles of arrival of signals transmitted by single base transceiver station antennas, and therefore experience highly independent fading characteristics. Although diversity communication may reduce the effects of multipath fading, diversity does not enable the increased bit rates that are enabled by spatial multiplexing.

Figure 3A:
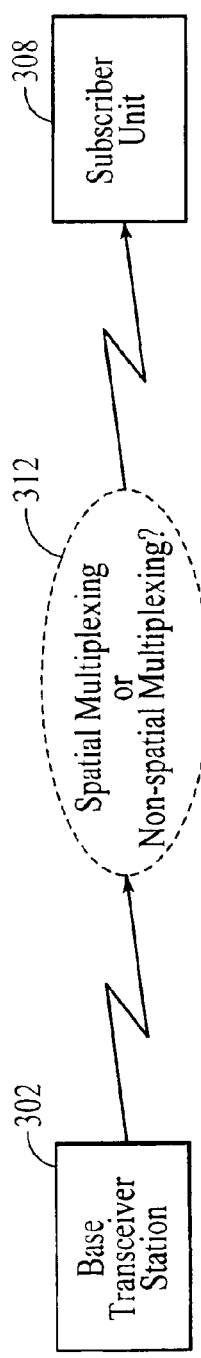
FIGS. 3A–3C depict example transmissions between a base transceiver station and a subscriber unit that represent how a wireless communications system adapts its mode of operation between spatial multiplexing and non-spatial multiplexing in response to transmission-specific variables in accordance with an embodiment of the invention.
Figure 3B:
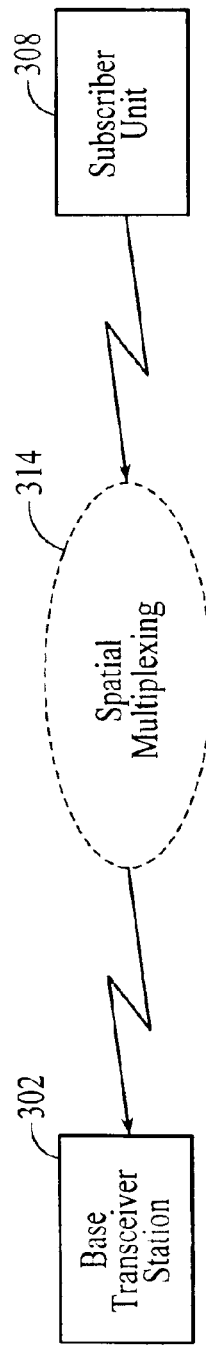
Figure 3C:
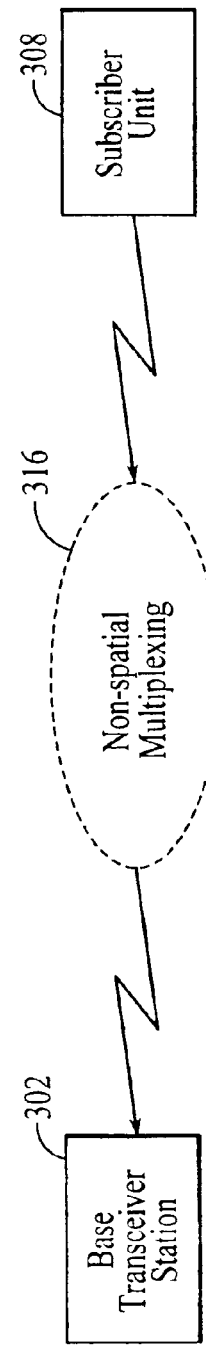

As stated above, the focus of the invention is a wireless communications system that adapts its mode of operation between spatial multiplexing and non-spatial multiplexing in response to transmission-specific variables. FIGS. 3A–3C depict example transmissions between a base transceiver station 302 and a subscriber unit 308 that represent how the wireless communications system adapts its mode of operation between spatial multiplexing and non-spatial multiplexing in response to transmission-specific variables. Referring to FIG. 3A, the base transceiver station transmits information 312 to the subscriber unit that is utilized to determine the appropriate mode of operation between the base transceiver station and the subscriber unit for subsequent subscriber datastream transmissions. The subscriber unit responds back to the base transceiver station to transmit subsequent subscriber datastreams using either spatial multiplexing or non-spatial multiplexing. FIG. 3B represents a transmission 314 from the subscriber unit to the base transceiver station indicating spatial multiplexing should be utilized for future transmissions. FIG. 3C represents a transmission 316 from the subscriber unit to the base transceiver station indicating non-spatial multiplexing should be utilized for future transmissions. The transmission-specific variables that are considered to determine whether spatial multiplexing should be used for subsequent transmissions are described in detail below.

Figure 3D:
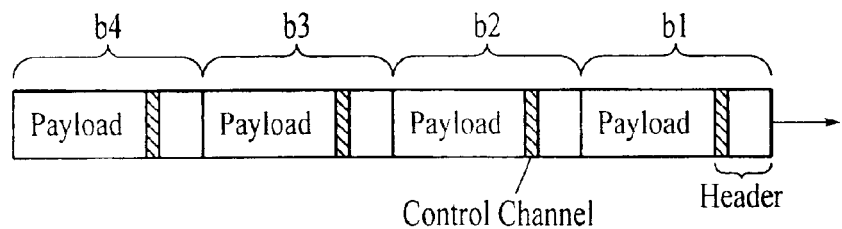
FIG. 3D depicts a stream of frames, with each frame including a payload, a header, and a control channel for communicating mode determination logic in accordance with an embodiment of the invention.

In an embodiment, the base transceiver stations and subscriber units communicate information related to the operation mode over a control channel. For example, a control channel may include a specified field of bits in a transmitted bitstream that are dedicated to communicating mode determination information. FIG. 3D represents the packets described above with reference to FIG. 2. Each of the packets (b1, b2, b3, and b4) includes a header 324 and a payload 322 as is known in the field of packet based networks. The packets also include a control channel 326, or field, which contains bits that are dedicated to communicating information related to the mode of operation between the base transceiver stations and the subscriber unit. The control channel may be located in the header or the payload portion of each packet, however it is preferably located in the header. In another embodiment, a control channel may involve a dedicated transmission frequency a dedicated time slot or some other identified communications channel. In an embodiment, the information 314 (shown in FIG. 3B), indicating that spatial multiplexing is preferred, is transmitted to the base transceiver station over the control channel and the information 316 (shown in FIG. 3C), indicating that non-spatial multiplexing is preferred, is transmitted to the base transceiver station over the control channel. In an embodiment, the information 312 (shown in FIG. 3A) that is used by the subscriber unit for mode determination is not transmitted over the control channel. For example the information 312 contains only the subscriber datastream that is being transmitted from the base transceiver station 302 to the subscriber unit 308. In another embodiment, the information that is used for mode determination includes training information that is provided to establish and fine tune a communications channel between a base transceiver station and a subscriber unit.

Figure 4:
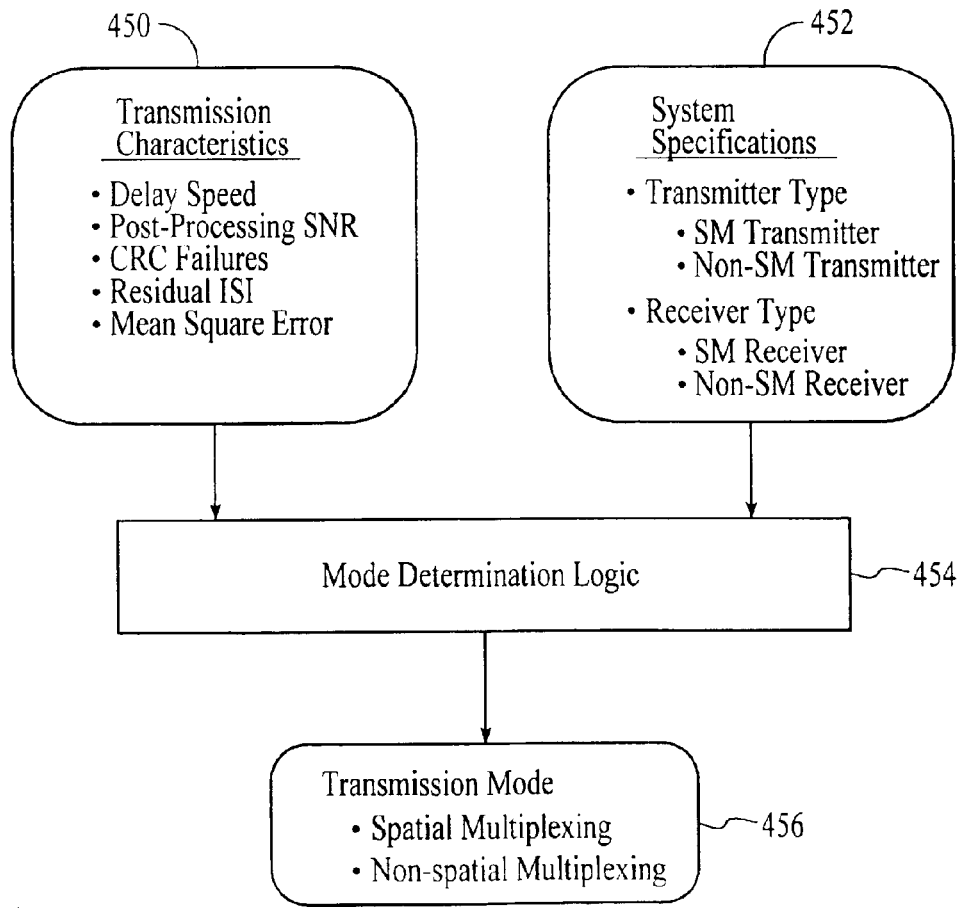
FIG. 4 depicts transmission-specific inputs to mode determination logic that are considered to determine the appropriate mode of operation between spatial multiplexing and non-spatial multiplexing in accordance with an embodiment of the invention.

FIG. 4 represents transmission-specific inputs 450 and 452 that are considered by the mode determination logic 454 to determine the appropriate mode of operation for subsequent datastream transmissions. The mode determination logic may consider any one of, or combination of, transmission-specific variables in the mode determination process. As shown in FIG. 4, the transmission-specific variables can be generally categorized as transmission characteristics and system specifications. Although the identified variables are not meant to be exhaustive, the transmission characteristics that may be considered in the mode determination process relate to a characteristic of a received signal and include delay spread, post-processing signal-to-noise ratio, cyclical redundancy check (CRC) failures, residual inter-symbol interference (ISI), mean square error, coherence time, and path loss. The transmission characteristics of a received signal will typically vary over time as transmission conditions change. The above-identified transmission characteristics are described in more detail below.

The system specifications that may be considered in the mode determination process include the transmitter type and/or the receiver type that are involved in a wireless communication. In particular, the receiver type has a significant effect on the acceptable thresholds that are established for certain transmission characteristics such as delay spread. The system specifications of wireless communications systems are set by the hardware and/or software capabilities of the base transceiver station(s) and the subscriber units. Wireless communications systems often do not have uniform base transceiver station and subscriber unit capabilities throughout the system and therefore, each base transceiver station and subscriber unit combination has a unique set of hardware and/or software capabilities. The capabilities of the base transceiver station and subscriber unit combination can effect the desired mode of operation. Some system specifications that are considered in mode determination are described in detail below.

In an embodiment, the mode determination logic 454 considers at least one of the transmission characteristics 450 in the mode determination process. In an embodiment, a transmission characteristic for a received signal is measured and compared to a transmission characteristic threshold. The mode of operation for a subsequent transmission is determined by whether or not the measured transmission characteristic exceeds the transmission characteristic threshold. Upon consideration of one, or a combination, of the transmission-specific variables, the mode determination logic outputs 456 an indication of the operation mode (either spatial multiplexing or non-spatial multiplexing) for a subsequent transmission. Because the mode determination logic determines the mode of operation in response to a measured transmission characteristic, or characteristics, the system adapts to utilize a mode of operation that is preferred for the current set of conditions. In an embodiment, it is assumed that spatial multiplexing is the desired mode of operation and that the system defaults to non-spatial multiplexing when transmission-specific conditions are not favorable for spatial multiplexing. In an embodiment, the transmission characteristic threshold(s) vary over time and are effected by parameters such as the system specifications and the transmission conditions.

In an embodiment, a system specification 452 is considered in addition to a transmission characteristic 450 by the mode determination logic 454 to determine the mode of operation for a subsequent transmission. In fact, the capability of the receiver involved in a wireless communication is an important consideration in establishing the threshold for a transmission characteristic. For example, a receiver with a robust spatial processor will have a relatively high delay spread threshold.

Transmission Characteristics

Delay spread is a measure of the maximum amount of time over which a signal arrives at a receiver. Delay spread exists because a transmitted signal propagates over multiple paths from the transmitter to the receiver, with environmental conditions causing each path to have a different length and therefore transmission time. When the delay spread is greater than the symbol period, the resulting channel will introduce inter-symbol interference ISI into the symbol stream.

In an embodiment, the measured delay spread for a received signal is compared to a delay spread threshold and if the measured delay spread exceeds the delay spread threshold, then the operation mode is switched from spatial multiplexing to non-spatial multiplexing for subsequent datastream transmissions. The delay spread threshold depends partially on the receiver type.

Receivers that attempt to remove the effects of a channel (i.e., linear receivers, decision feedback receivers, and successive canceling receivers) deliver a symbol stream to a symbol block. The signal-to-noise ratio of the symbol stream is referred to as the post-processing signal-to-noise ratio since it is computed after removing the effects of the channel and any other interfering transmissions (in a vector transmission system). The post-processing signal-to-noise ratio is often a function of the channel, the equalizer parameters, and the noise power. Larger post-processing signal-to-noise ratios are generally preferred to smaller post-processing signal-to-noise ratios.

A post-processing signal-to-noise ratio threshold establishes the minimum acceptable signal-to-noise ratio required to ensure data quality. The post-processing signal-to-noise ratio for a received signal is compared to the post-processing signal-to-noise ratio threshold and if the signal-to-noise ratio drops below the signal-to-noise ratio threshold, then the operation mode is switched from spatial multiplexing to non-spatial multiplexing for subsequent datastream transmissions.

A CRC failure indicates an error in a transmission. A CRC failure threshold can be established which ensures an acceptable transmission quality when using spatial multiplexing. The number of CRC failures in a spatially multiplexed transmission between a base transceiver station and a subscriber unit can be monitored and compared to the CRC failure threshold. If the number of CRC failures exceeds the CRC failure threshold, then the operation mode is switched from spatial multiplexing to non-spatial multiplexing.

Residual ISI is the ISI that remains after the receiver has processed the received signal and has attempted to cancel the ISI. A large residual ISI indicates that all the ISI was not canceled. Residual ISI reduces the post-processing signal-to-noise ratio because it increases the effective noise and therefore increases the error rate. A residual ISI threshold establishes the maximum acceptable residual ISI that is allowable to ensure data quality. The residual ISI for a received signal is compared to the residual ISI threshold and if the measured residual ISI exceeds the residual ISI threshold, then the operation mode is switched from spatial multiplexing to non-spatial multiplexing for subsequent datastream transmissions. The residual ISI threshold depends partially on the receiver type.

The mean square error indicates how well the filter coefficient of minimum mean square error (MMSE), linear, and decision feedback receivers equalize a channel. A large mean square error indicates that there is a large amount of noise or that the channel is difficult to equalize. A mean square error threshold establishes the maximum acceptable mean square error allowable to ensure data quality. The mean square error for a received signal is compared to the mean square error threshold and if the mean square error exceeds the mean square error threshold, then the operation mode is switched from spatial multiplexing to non-spatial multiplexing for subsequent datastream transmissions. The mean square error threshold depends partially on the receiver type.

The coherence time is a measure of how fast the channel is changing over time. Essentially it is a statistical measure which reveals how the long the channel remains effectively invariant. It is related to the Doppler spread of the channel and the velocity of the subscriber unit. A small coherence time means the channel is changing rapidly while a large coherence time means the channel is changing slowly. A coherence time threshold establishes the maximum tolerable coherence time to ensure data quality. The coherence time is measured for a received signal and is compared to the coherence time threshold. If the coherence time exceeds the threshold then the operation mode is switched from spatial multiplexing to non-spatial multiplexing for subsequent data transmissions. The coherence time threshold partially depends on the receiver type.

The path loss is a measure of signal attenuation from transmitter to receiver. It is a function of the channel parameters and increases as distance between transmitter and receiver increases. A path loss threshold establishes the maximum tolerable path loss to ensure data quality. The path loss is measured for a received signal and is compared to the path loss threshold. If the coherence time exceeds the threshold then the operation mode is switched from spatial multiplexing to non-spatial multiplexing for subsequent data transmissions. The path loss threshold partially depends on the receiver type.

System Specifications

The type of receiver involved in a wireless communication is a key system specification that influences the transmission characteristic thresholds that are described above. Receivers that support spatial multiplexing include maximum likelihood, multiple in multiple out (MIMO) decision feedback, MIMO linear equalization, and successive cancellation receivers. Receivers that support non-spatial multiplexing include maximum likelihood, multiple in multiple out (MIMO) decision feedback, MIMO linear equalization, and successive cancellation receivers. Although these receiver types are well known in the field of wireless communications systems, a brief description of these receiver types is provided at the end of the specification for background.

In an embodiment, the mode determination logic is located within the subscriber units. In another embodiment, the mode determination logic is located within the base transceiver stations and in another embodiment, the mode determination logic is distributed throughout the wireless communication system, with some portions of the mode determination logic in the subscriber units, the base transceiver stations, and/or the master switch center.

Figure 8:
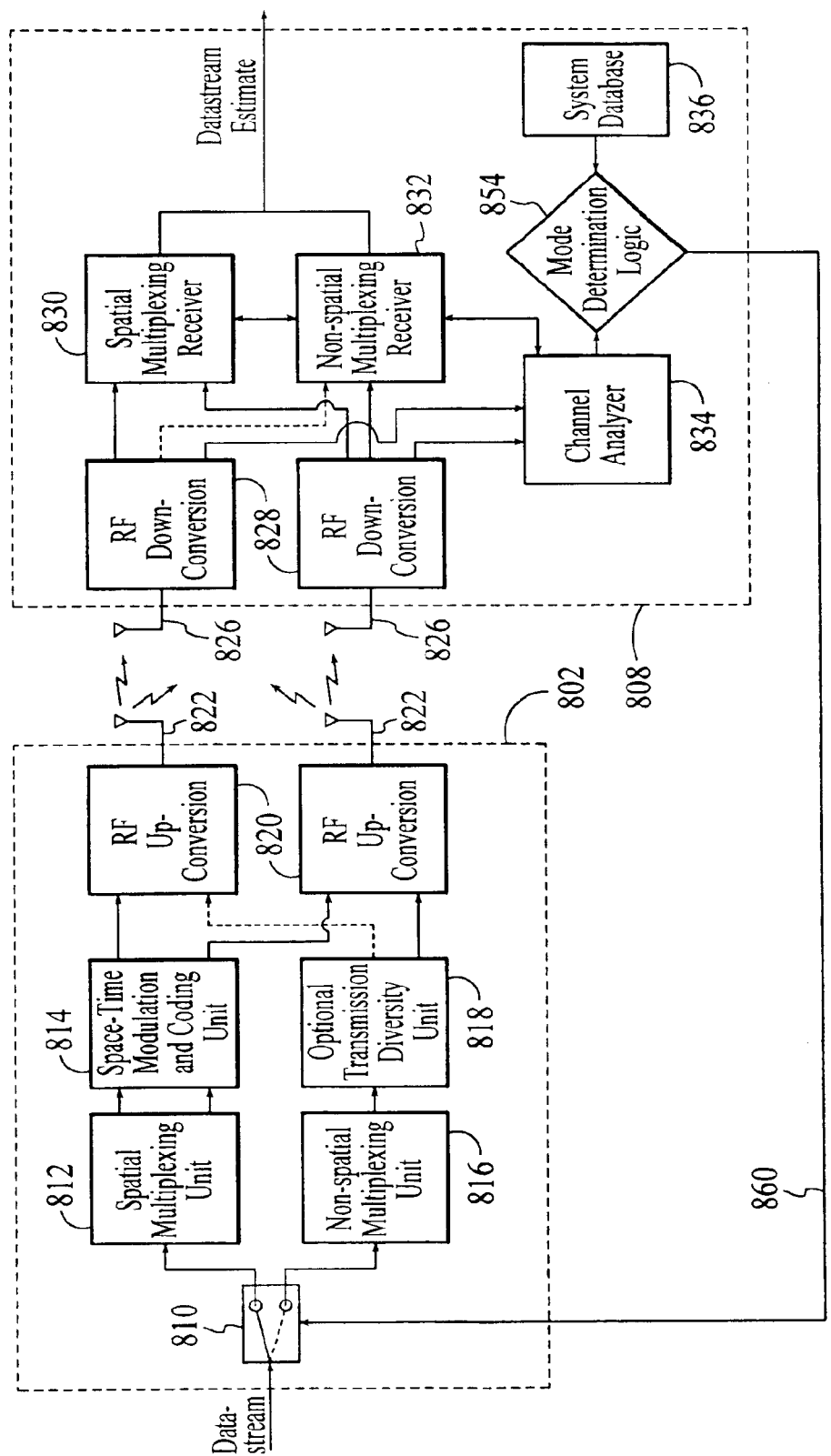
FIG. 8 depicts an embodiment of a base transceiver station and a subscriber unit that are equipped to adapt their mode of operation between spatial multiplexing and non-spatial multiplexing in response to transmission-specific variables in accordance with an embodiment of the invention.

Systems necessary to measure, generate, and/or store the transmission characteristics and the system specifications that are considered by the mode determination logic may be located in the subscriber units, the base transceiver stations, and/or the master switch center. In an embodiment, the above-described transmission characteristics are processed through a channel analyzer and the system specifications are maintained in a system database. Both the channel analyzer and the system database are depicted in FIG. 8.

Figure 5:
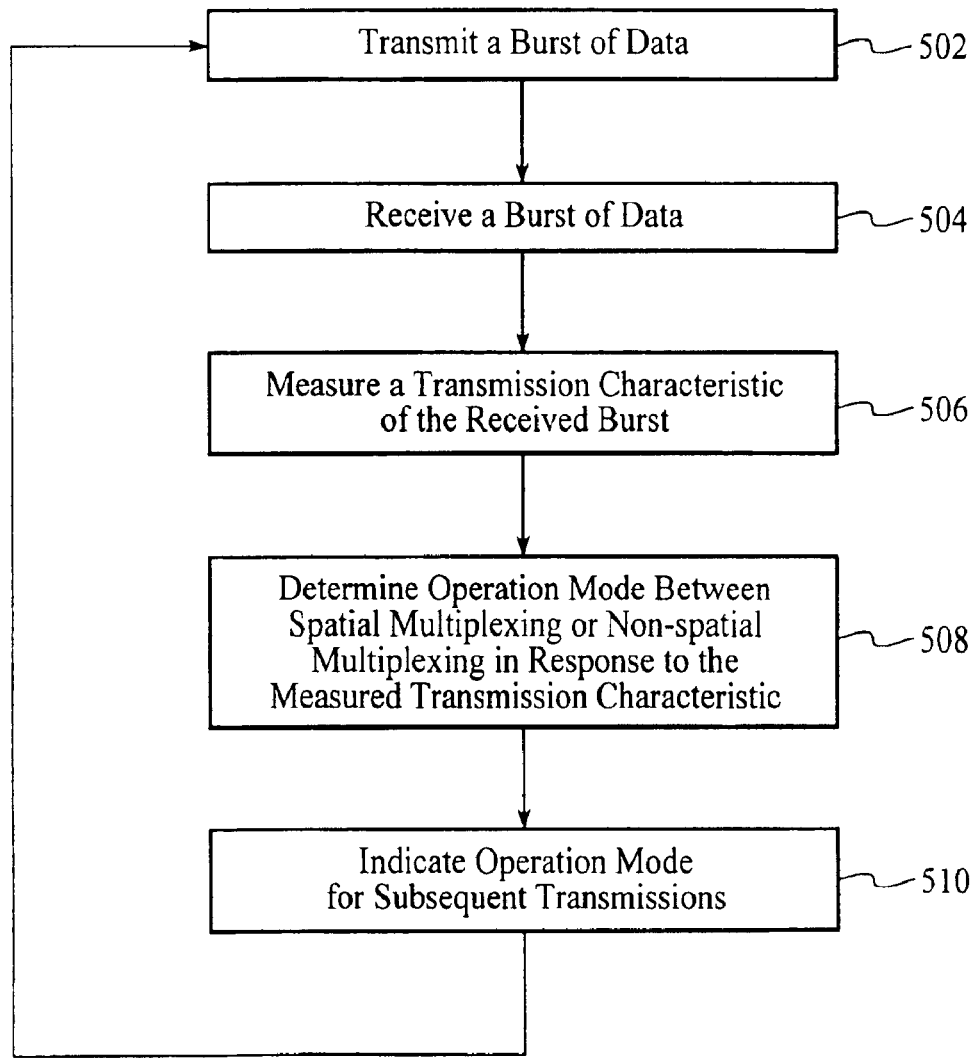
FIG. 5 is a process flow diagram of a method for adapting the mode of operation of a wireless communications system between spatial multiplexing and non-spatial multiplexing in response to transmission-specific variables in accordance with an embodiment of the invention.

FIG. 5 is a process flow diagram of a method for adapting the mode of operation of a wireless communications system between spatial multiplexing and non-spatial multiplexing in response to transmission-specific variables. In a step 502, a burst of data is transmitted. In a step 504, the burst of data is received. In a step 506, a transmission characteristic of the burst of data is measured. For example, the measured transmission characteristic may include one or more of delay spread, post-processing signal-to-noise ratio, CRC failure, residual inter-symbol interference, mean square error, coherence time, path loss. In a step 508, the mode of operation is determined between spatial multiplexing or non-spatial multiplexing in response to the measured transmission characteristic. In an embodiment, the mode determination involves comparing a measured transmission characteristic to a transmission characteristic threshold and selecting the mode of operation in response to the comparison. In a step 510, the mode of operation for subsequent transmissions is indicted and then the process is repeated. In an embodiment, the preferred mode of operation is indicated to the base transceiver station over a control channel. As described above, the control channel includes a specified field in a packet (or frame) for indicating the preferred mode of operation.

Figure 6:
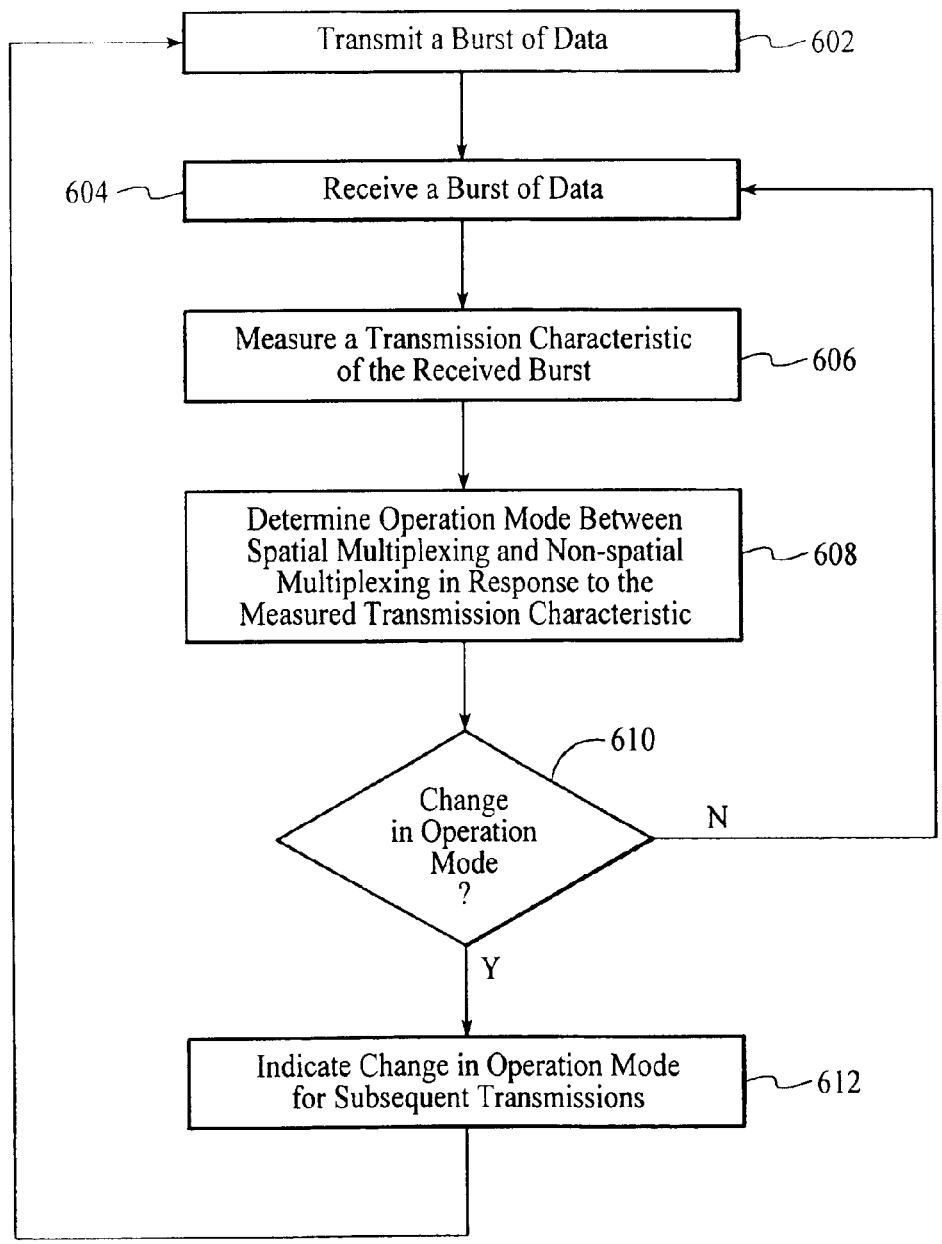
FIG. 6 is a process flow diagram of another method for adapting the mode of operation of a wireless communications system between spatial multiplexing and non-spatial multiplexing in response to transmission-specific variables in accordance with an embodiment of the invention.

FIG. 6 is a process flow diagram of another method for adapting the mode of operation of a wireless communications system between spatial multiplexing and non-spatial multiplexing in response to transmission-specific variables. The method of FIG. 6 differs from the method of FIG. 5 in that only a change in the mode of operation is indicated for subsequent transmissions. That is, if the mode of operation is not going to change in response to a measured transmission characteristic then the operation mode for subsequent transmissions is not indicated to the respective transmitter. Referring to FIG. 6, in a step 602, a burst of data is transmitted. In a step 604, the burst of data is received. In a step 606, a transmission characteristic of the burst of data is measured. For example, the measured transmission characteristic may include one or more of delay spread, post-processing signal-to-noise ratio, CRC failure, residual inter-symbol interference, mean square error, coherence time, path loss. In a step 608, the mode of operation is determined between spatial multiplexing or non-spatial multiplexing in response to the measured transmission characteristic. At decision point 610, if the mode of operation is going to be changed from the current mode, then at step 612, the change in the mode of operation for subsequent transmissions is indicated and then the process is repeated. As described above, a control channel can be used to indicate a change in the mode of operation. If the mode of operation is not going to be changed from the current mode, then the next burst of data can be received at step 604 and then the process is repeated.

Figure 7:
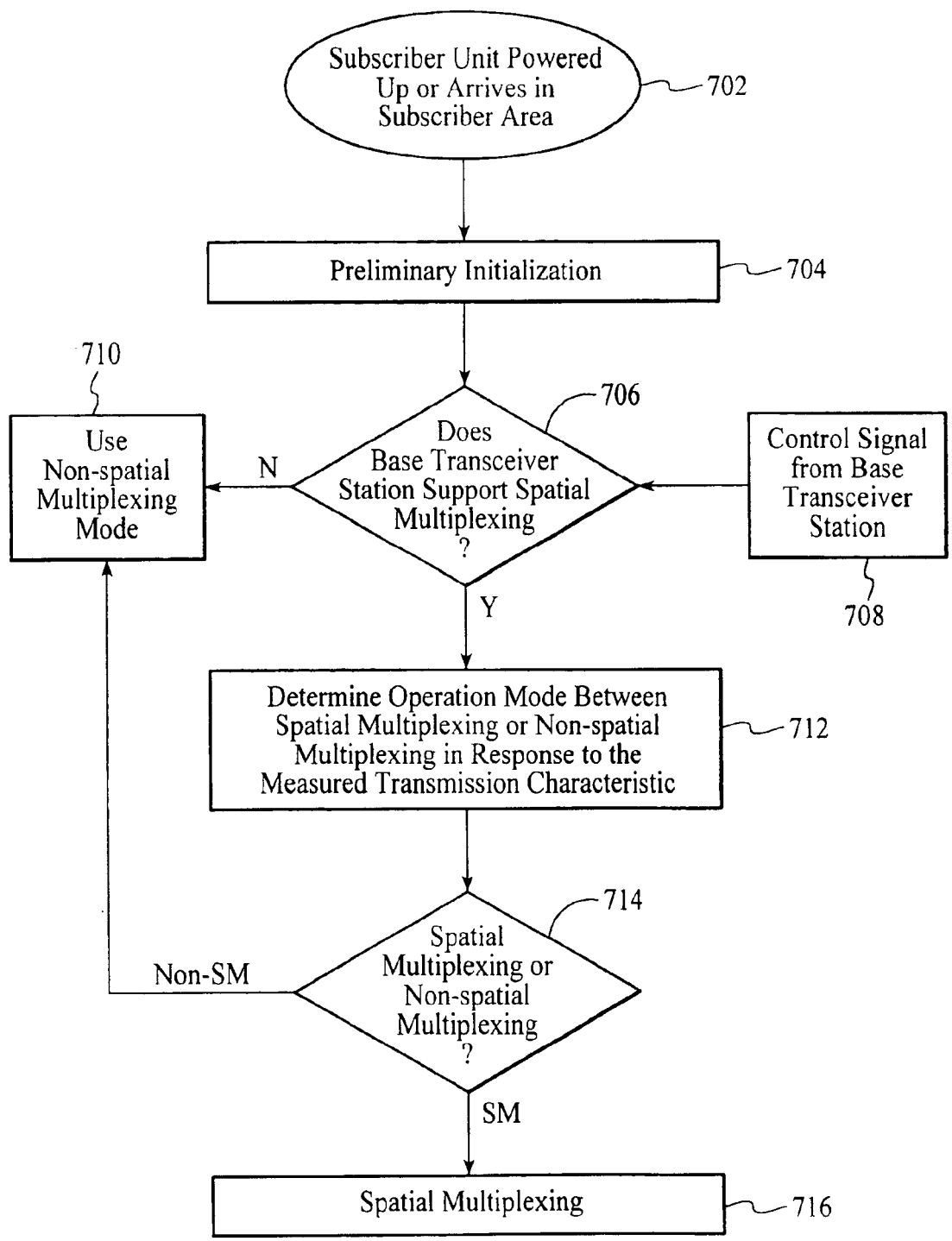
FIG. 7 is a process flow diagram of a method for link initialization between a base transceiver station and a subscriber unit that adapts its mode of operation between spatial multiplexing and non-spatial multiplexing in response to transmission-specific variables in accordance with an embodiment of the invention.

While the process flow diagrams of FIGS. 5 and 6 apply particularly to maintaining a link between a base transceiver station, or base transceiver stations, and a subscriber unit, the process flow diagram of FIG. 7 can be applied to link initialization between a base transceiver station(s) and a subscriber unit. For example, the link initialization method applies when a subscriber unit is powered up or when a subscriber unit enters a subscriber area (or cell). In a step 702 a subscriber unit is powered up or arrives in the subscriber area. In a step 704, the subscriber unit goes through a preliminary initialization as is known in the field of multiple access wireless communications. In an embodiment, the preliminary initialization may involve the subscriber unit sending a control signal (over a dedicated control channel) to the base transceiver stations in the cell that indicates the capability of the subscriber unit (for example, whether or not the subscriber unit supports spatial multiplexing). At decision point 706, the subscriber unit receives a control signal 708 from a base transceiver station(s) that indicates whether or not the base transceiver station(s) supports spatial multiplexing. In an embodiment, spatial multiplexing capability is indicated by a control signal that is transmitted over a dedicated control channel and the lack of spatial multiplexing capability is indicated by the lack of a control signal.

Based on the control signals and the capabilities of the base transceiver station(s) and the subscriber unit, an initial decision is made as to whether or not spatial multiplexing can be used for transmission of subscriber datastreams. If the subscriber unit or the base transceiver station(s) does not support spatial multiplexing, then at step 710, the decision to use a non-spatial multiplexing mode of operation is made and communicated over the control channel. If both the subscriber unit and the base transceiver station(s) support spatial multiplexing, then at step 712, the mode of operation is determined between spatial multiplexing and non-spatial multiplexing in response to the transmission-specific variables described above with reference to FIG. 4. At decision point 714, if the mode of operation is determined to be non-spatial multiplexing, then at step 710, a non-spatial multiplexing mode of operation is used for subsequent datastream transmissions. If the mode of operation is determined to be spatial multiplexing, then at step 716 the spatial multiplexing mode of operation is used for subsequent datastream transmissions. The method of FIG. 7 creates a wireless communications system in which subscriber units that do and do not support spatial multiplexing can be used with the same infrastructure.

The methods of FIGS. 5–7 are also applicable to mode determinations that are made in response to the location of a subscriber unit within a cell array. That is, the mode of operation may be influenced by the location of a subscriber unit within a cell or influenced by the subscriber unit traveling between cells. In some situations, one cell may support spatial multiplexing while an adjacent cell does not support spatial multiplexing. As the subscriber unit travels between cells, the mode of operation may change in response to the capabilities of the base transceiver stations in the cell, the capability of the subscriber unit, and/or the proximity of the subscriber unit within the cell. For example, as a subscriber unit travels from a spatial multiplexing supported cell to a non-spatial multiplexing cell, a subscriber unit using spatial multiplexing must switch to a non-spatial multiplexing mode of operation. Alternatively, as a subscriber unit travels from a non-spatial multiplexing supported cell to a spatial multiplexing supported cell, the subscriber unit may switch from a non-spatial multiplexing mode of operation to a spatial multiplexing mode of operation. Handoff indicators that may be considered by the mode determination logic include received signal strength from current and potential base transceiver stations, interference measurements, and measurements of the signal-to-interference level between current and desired base stations.

FIG. 8 depicts an embodiment of a base transceiver station 802 and a subscriber unit 808 that are equipped to adapt their mode of operation between spatial multiplexing and non-spatial multiplexing in response to transmission-specific variables. As shown in FIG. 8, the base transceiver station includes a mode switch 810, a spatial multiplexing unit 812, a space-time modulation and coding unit 814, a non-spatial multiplexing unit 816, an optional transmission diversity unit 818, RF upconversion units 820, and transmitter antennas 822. The subscriber unit includes receiver antennas 826, RF downconversion units 828, a spatial multiplexing receiver 830, a non-spatial multiplexing receiver 832, a channel analyzer 834, a system database 836, and mode determination logic 854. Although the base transceiver station and subscriber unit are depicted with two antennas each, either or both of the base transceiver stations and subscriber units may include more than two antennas.

In operation, a signal is transmitted from the base transceiver station 802 to the subscriber unit 808. In an embodiment, the transmitted signal is part of a subscriber datastream although this is not critical. In another embodiment, the transmitted signal is a training signal, part of a subscriber data stream or sent over a control channel, which is utilized to calibrate the receiver electronics. If the signal is transmitted using the spatial multiplexing unit 812 of the base transceiver station then the signal is processed by the spatial multiplexing receiver 830 of the subscriber unit and if the signal is transmitted using non-spatial multiplexing unit 816 of the base transceiver station then the signal is processed by the non-spatial multiplexing receiver 832 of the subscriber unit. Whether the signal is transmitted using spatial multiplexing or non-spatial multiplexing, the received signal is analyzed by the channel analyzer 834 to measure a transmission characteristic such as delay spread, post-processing signal-to-noise ratio, CRC failures, residual ISI, or mean square error, coherence time, or path loss. The system database 836 stores system specifications that can also be considered for mode determination. In an embodiment, the system database includes fixed parameters, such as the type, or types, of receiver that is available in the subscriber unit for signal processing The mode determination logic 854 considers at least one of the measured transmission characteristics from the channel analyzer 834 and optionally information from the system database 836 to determine whether the next mode of operation should be spatial multiplexing or non-spatial multiplexing. Determining the mode of operation preferably involves comparing a measured transmission characteristic to a transmission characteristic threshold as described above. A signal indicating the mode determination from the mode determination logic is transmitted over a control channel to the mode switch 810 as represented by feedback loop 860. The mode switch is set to either the spatial multiplexing mode or non-spatial multiplexing mode in response to the signal from the mode determination logic. The setting of the mode switch dictates the mode of operation for subsequent subscriber datastream transmissions. The process of considering transmission-specific variables and adapting the mode of operation in response to the transmission-specific variables is repeated at a cycle time that can be adjusted as necessary. The mode determination process can be reversed when a subscriber datastream is transmitted from the subscriber unit to the base transceiver station.

Brief Description of Receivers

This section describes various receiver algorithms known in the field of wireless communications. The goal of a receiver is to provide an estimate of the transmitted symbol stream. For the purpose of discussion we suppose that symbols s(0), . . . , s(N) are transmitted through a channel $h_c(t)$, $t=[0, t_{max}]$ and received as y(n)=h(n)*s(n)+v(n) where * is the convolution and h(n) is means $h_c(nTs)$, the channel sampled at the symbol period.

Maximum Likelihood (Vector-MLSE) Receiver—This is the optimum receiver when the transmitted sequences are equally likely. The maximum likelihood receiver estimates the transmitted sequence as the sequence of symbols which maximizes the likelihood (in a mathematical sense). Formally, the maximum likelihood estimate is the symbol stream s(0), . . . , s(N) such that Probability (observe y(0), . . . , y(N)| given s(0), . . . , s(N)) is larger than all other symbol streams. Since s(n) come from a finite alphabet, there are a finite number of sequences over which to search. This receiver is typically implemented using the Viterbi algorithm.

Linear Equalization Receiver—Suppose the channel impulse response is h(n), nonzero for n=0, . . . N. The goal of linear equalization is to find a filter g(n), nonzero for n=0, . . . K, such that g(n)*h(n) (the convolution of g(n) and h(n)) satisfies a certain criterion. Potential equalization criteria include zero forcing and minimum mean squared error (MMSE). The zero-forcing criterion is to design g(n) such that $|g(n)*h(n)-d(n-D)|^2$ is as small as possible (where d(n) is the delta function and D is a chosen delay). The MMSE criterion is to design g(n) such that $E[g(n) y(n)-s(n)]^2$ is minimized. This leads to the well known Wiener equalizer. In an embodiment, a linear equalizer performs the following steps. (1) estimate channel h(n), noise variance, etc.; (2) form estimate equalizer g(n); (3) filter the received data, i.e., form s(n)=g(n)*y(n); and (4) estimate the transmitted symbols from s(n).

Decision Feedback Receiver—Unlike the maximum likelihood receiver, the linear equalization receiver described above tries to remove the effects of the channel irrespective of the finite alphabet property of s(n). One approach to improve the performance of the linear receiver is to include a feedback loop that operates on the post-detection symbols. After sampling, the received signal y(n) passes through a feedforward filter f(n). The filter is designed to remove the precursor ISI from the channel impulse response h(t), the ISI due to future symbols. Past symbols are passed through the feedback filter b(n) and subtracted from the input sequence. Filter coefficients for f(n) and b(n) can be found again using MMSE or zero-forcing criteria although the formulae are more involved.

Successive Cancellation Receiver—The maximum likelihood, linear equalization, and decision feedback receivers can be used in either scalar (systems with one transmit antenna) or vectors (systems with multiple antennas). A successive cancellation receiver is suitable only when there are multiple transmissions. Suppose a signal s1(n) is transmitted from antenna 1 and a signal s2(n) is transmitted from antenna 2. These symbols are mixed by the channel as they arrive at the receiver. To estimate the symbol streams, symbol stream s1(n) is estimated assuming that s2(n) is noise using one of the above receivers. Then the contribution of s1(n) is subtracted out and s2(n) is estimated in a likewise fashion. A good successive cancellation receiver will have an algorithm that chooses the better of s1(n) or s2(n) for the first step of decoding.

What is claimed is:

1. A wireless communications system for transmitting information between a base transceiver station and a subscriber unit comprising:
   rode determination logic, in communication with said base transceiver station and said subscriber unit, for determining, in response to a received signal, if a subscriber datastream should be transmitted between said base transceiver station and said subscriber unit utilizing spatial multiplexing or non-spatial multiplexing, the mode determination logic including:
      a comparator(s) logic to compare a delay spread measure for said received signal to a delay spread threshold; and
      a selector(s) to select spatial multiplexing for transmission of said subscriber datastream if said delay spread measure is below said delay spread thresholds.

2. The wireless communications system of claim 1 wherein said mode determination logic has an input for receiving a measure of a transmission characteristic related to said received signal.

3. The wireless communications system of claim 2 wherein said mode determination logic includes logic for:
   comparing said measured transmission characteristic to a transmission characteristic threshold; and
   selecting one of spatial multiplexing and non-spatial multiplexing in response to said comparison of said measured transmission characteristic to said transmission characteristic threshold.

4. The wireless communications system of claim 3 wherein said transmission characteristic threshold varies in response to system conditions.

5. The wireless communications system of claim 2 wherein said transmission characteristic includes at least one of:
   delay spread;
   post-processing signal-to-noise ratio;
   cyclical redundancy check (CRC) failure;
   residual inter-symbol interference;
   mean square error;
   coherence time; or
   path loss.

6. The wireless communications system of claim 1 wherein said base transceiver station and said subscriber unit utilize a multiple access protocol to transmit said subscriber datastream, wherein said multiple access protocol is selected from at least one of a group of multiple access protocols consisting of: code-division multiple access, frequency-division multiple access, time-division multiple access, space-division multiple access, orthogonal frequency division multiple access, orthogonal division multiple access, and quasi-orthogonal division multiple access.

7. The wireless communications system of claim 1 wherein mode determination information is communicated between said base transceiver station and said subscriber unit over a control channel.

8. The wireless communications system of claim 1 wherein said mode determination logic includes logic for:
   comparing a post-processing signal-to-noise ratio for said received signal to a post-processing signal-to-noise ratio threshold; and
   selecting spatial multiplexing for transmission of said subscriber datastream if said post-processing signal-to-noise ratio is above said post-processing signal to noise ratio threshold.

9. The wireless communications system of claim 1 wherein said mode determination logic includes logic for:
- receiving a CRC failure indicator in response to said received signal; and
- selecting non-spatial multiplexing for transmission of said subscriber datastream when said CRC failure indicator exceeds a CRC failure threshold.

10. The wireless communications system of claim 1 wherein said mode determination logic includes logic for:
- comparing a residual inter-symbol interference measure for said received signal to a residual inter-symbol interference threshold, and
- selecting spatial multiplexing for transmission of said subscriber datastream if said residual inter-symbol interference measure is below said residual inter-symbol interference threshold.

11. The wireless communications system of claim 1 wherein said mode determination logic includes logic for:
- calculating a mean square error for said received signal; and
- selecting spatial multiplexing for transmission of said subscriber datastream if said calculated mean square error is below a mean square error threshold.

12. The wireless communications system of claim 1 wherein said mode determination logic includes logic for:
- comparing a coherence time measure for said received signal to a coherence time threshold; and
- selecting spatial multiplexing for transmission of said subscriber data stream if said coherence time measure exceeds said coherence time threshold.

13. The wireless communications system of claim 1 wherein said mode determination logic includes logic for:
- comparing a path loss measure for said received signal to a path loss threshold; and
- selecting spatial multiplexing for transmission of said subscriber data stream if said path loss measure exceeds said path loss threshold.

14. The wireless communications system of claim 1 wherein said mode determination logic has an input for receiving system specifications related to the signal receive capability of at least one of said base transceiver station and said subscriber unit.

15. The wireless communications system of claim 1 wherein said mode determination logic has an input for receiving system specifications related to the signal transmit capability of at least one of said base transceiver station and said subscribe unit.

16. The wireless communications system of claim 1 wherein said mode determination logic includes logic for:
- determining if both said base transceiver station and said subscriber unit support spatial multiplexing; and
- selecting non-spatial multiplexing for transmission of said subscriber datastream if one of said base transceiver station and said subscriber unit does not support spatial multiplexing.

17. The wireless communications system of claim 1 wherein non-spatial multiplexing transmission modes include single-carrier transmissions, multi-carrier transmissions, multi-code transmission, transmit diversity, and beamforming.

18. The wireless communications system of claim 17 wherein transmit diversity includes selection diversity, space-time coding, and maximum ratio combining.

19. The wireless communications system of claim 17 wherein said base transceiver station and said subscriber unit are capable of transmitting said subscriber datastream in more than one of said non-spatial multiplexing transmission modes.

20. The wireless communications system of claim 1 wherein said mode determination logic resides within said subscriber unit.

21. The wireless communications system of claim 1 wherein said mode determination logic resides within said base transceiver station.

22. A method for operating a wireless communications system comprising steps of:
- receiving a signal transmission at one of a base transceiver station and a subscriber unit via said wireless communications system;
- measuring a transmission characteristic of the received signal transmission;
- comparing the measured characteristic to a characteristic threshold, wherein the threshold may vary in response system conditions; and
- selecting one of spatial multiplexing and non-spatial multiplexing in response to said comparison of said measured transmission characteristic to said transmission characteristic threshold.

23. The method of claim 22 wherein said transmission characteristic includes at least one of:
- delay spread for said received signal transmission;
- post-processing signal-to-noise ratio for said received signal transmission;
- CRC failure for said received signal transmission;
- residual inter-symbol interference for said received signal transmission;
- mean square error for said received signal transmission;
- coherence time for said received signal transmission; or
- path loss.

24. The wireless communications system of claim 22 wherein said base transceiver station and said subscriber unit utilize a multiple access protocol to transmit said subscriber datastream, wherein said multiple access protocol is selected from at least one of a group of multiple access protocols consisting of: code-division multiple access, frequency-division multiple access, time-division multiple access, space-division multiple access, orthogonal frequency division multiple access, orthogonal division multiple access, and quasi-orthogonal division multiple access.

25. The method of claim 22 further including a step of indicating an operation mode for subsequent transmissions in response to said determination.

26. The method of claim 25 further including a step of using a dedicated control channel to indicate said operation mode.

27. The method of claim 22 further including a step of indicating a change in operation mode for subsequent transmissions in response to said determination.

28. The method of claim 27 further including a step of using a dedicated control channel to indicate said change in operation mode.

29. The method of claim 22 further including a step of communicating the spatial multiplexing or non-spatial multiplexing capability of one of said base transceiver station and said subscriber unit using a dedicated control channel.

30. The method of claim 22 further including steps of:
- handing off said subscriber unit from a first base transceiver station to a second base transceiver station; and
- switching the mode of operation between spatial multiplexing and non-spatial multiplexing in response to said handoff.

31. The method of claim 22 further including steps of:
determining when said subscriber unit has traveled from a first coverage cell to a second coverage cell; and
switching the mode of operation between spatial multiplexing and non-spatial multiplexing in response to said change of coverage cells.

32. The method of claim 22 further including steps of:
determining if both said base transceiver station and said subscriber unit support spatial multiplexing; and
selecting non-spatial multiplexing if one of said base station transmission station and said subscriber unit does not support spatial multiplexing.

33. The method of claim 22 further including step of:
comparing a delay spread measure for said received signal transmission to a delay spread threshold; and
selecting spatial multiplexing for transmission of said subscriber datastream if said delay spread measure is below said delay spread threshold.

34. The method of claim 22 further including steps of:
comparing a post-processing signal-to-noise ratio for said received signal transmission to a post-processing signal-to-noise ratio threshold; and
selecting spatial multiplexing for transmission of said subscriber datastream if said post-processing signal-to-noise ratio is above said post-processing signal to noise ratio threshold.

35. The method of claim 22 further including steps of:
receiving a CRC failure indicator in response to said received signal transmission; and
selecting non-spatial multiplexing for transmission of said subscriber datastream when said CRC failure indicator exceeds a CRC failure threshold.

36. The method of claim 22 further including steps of;
comparing a residual inter-symbol interference measure for said received signal transmission to a residual inter-symbol interference threshold, and
selecting spatial multiplexing for transmission of said subscriber datastream if said residual inter-symbol interference measure is below said residual inter-symbol interference threshold.

37. The method of claim 22 further including steps of:
calculating a mean square error for said received signal transmission; and
selecting spatial multiplexing for transmission of said subscriber datastream if said calculated mean square error is below a mean square error threshold.

38. The method of claim 22 further including steps of:
comparing a coherence time measure for said received signal to a coherence time threshold; and selecting spatial multiplexing for transmission of said subscriber data stream if said coherence time measure exceeds said coherence time threshold.

39. The method of claim 22 further including steps of:
comparing a path loss measure for said received signal to a path loss threshold; and
selecting spatial multiplexing for transmission of said subscriber data stream if said path loss measure exceeds said path loss threshold.

40. A wireless communications system for transmitting information between a base transceiver station and a subscriber unit comprising:
a control channel for communicating if a subscriber datastream should be transmitted between said base transceiver station and said subscriber unit utilizing spatial multiplexing or non-spatial multiplexing, wherein the control channel is used to indicate the spatial multiplexing or non-spatial multiplexing capability of one of the base transceiver station and/or the subscriber unit.

41. The wireless communications system of claim 40 wherein said control channel is used to indicate a change in the mode of operation between spatial multiplexing and non-spatial multiplexing.

42. The wireless communications system of claim 40 wherein said control channel includes a dedicated field in a frame that is part of said subscriber datastream.

43. The wireless communication system of claim 40 further including mode determination logic, in communication with said base transceiver station and said subscriber unit, for determining, in response to a received signal, if a subscriber datastream should be transmitted between said base transceiver station and said subscriber unit utilizing spatial multiplexing or non-spatial multiplexing.

44. The wireless communications system of claim 43 wherein said mode determination logic has an input for receiving a measure of a transmission characteristic related to said received signal.

45. The wireless communications system of claim 44 wherein said mode determination logic includes logic for:
comparing said measured transmission characteristic to a transmission characteristic threshold; and
selecting one of spatial multiplexing and non-spatial multiplexing in response to said comparison of said measured transmission characteristic to said transmission characteristic threshold.

46. The wireless communications system of claim 45 wherein said transmission characteristic includes at least one of:
delay spread;
post-processing signal-to-noise ratio;
cyclical redundancy check (CRC) failure;
residual mean inter-symbol interference;
mean square error;
coherence time; or
path loss.

47. The wireless communications system of claim 40 wherein said base transceiver station and said subscriber unit utilize a multiple access protocol to transmit said subscriber datastream, wherein said multiple access protocol is selected from at least one of a group of multiple access protocols consisting of code division multiple access, frequency-division multiple access, time-division multiple access, space-division multiple access, orthogonal frequency division multiple access, orthogonal division multiple access, and quasi-orthogonal division multiple access.

* * * * *